United States Patent [19]

Feisel

[11] Patent Number: 5,209,020
[45] Date of Patent: May 11, 1993

[54] METHOD OF AND APPARATUS FOR PROFILING GRINDING WHEELS

[75] Inventor: Armin Feisel, Schaffhausen, Switzerland

[73] Assignee: Reishauer A.G., Wallisellen, Switzerland

[21] Appl. No.: 789,026

[22] Filed: Nov. 7, 1991

[30] Foreign Application Priority Data

Nov. 7, 1990 [CH] Switzerland .................. 03539/90

[51] Int. Cl.⁵ ........................................... B24B 53/00
[52] U.S. Cl. ..................................... 51/5 D; 51/2 F;
51/165.87; 51/325; 125/11.04; 125/11.11; 125/11.23
[58] Field of Search .......... 51/2 F, 5 D, 52 R, 52 HB,
51/95 R, 95 GH, 95 TG, 95 LH, 105 GG, 105
HB, 165.71, 165.77, 165.87, 165.88, 287, 325;
125/11.01–11.04, 11.11, 11.13, 11.15, 11.19,
11.21, 11.23

[56] References Cited

U.S. PATENT DOCUMENTS 2,720,062 10/1955 Fouquet .
4,417,422 11/1983 Redeker et al. ................. 51/5 D
4,475,319 10/1984 Wirz .
4,490,946 1/1985 Tsujiuchi et al. ............ 51/165.77 X
4,559,744 12/1985 Wirz .
4,635,404 1/1987 Wirz .

FOREIGN PATENT DOCUMENTS 0287973 12/1987 Japan ........................... 125/11.04

Primary Examiner—Bruce M. Kisliuk
Assistant Examiner—John A. Marlott
Attorney, Agent, or Firm—Sughrue, Mion, Zinn, Macpeak & Seas

[57] ABSTRACT

A method and apparatus for profiling a grinding wheel (12) used to grind a workpiece (6) includes selectively feeding the grinding wheel radially against a dressing roller (19) to dress the wheel. Between successive dressing operations, the dressing roller (19) is conditioned with a conditioning wheel (50) movable radially thereto. Either the dressing roller or the conditioning wheel is movable axially relative to the other. The dressing roller (19) makes linear contact with the grinding wheel (12), and makes pointwise contact with the conditioning wheel (50). The relative radial and axial movements between the conditioning wheel (50) and the dressing roller (19) are synchronized by program control.

20 Claims, 4 Drawing Sheets

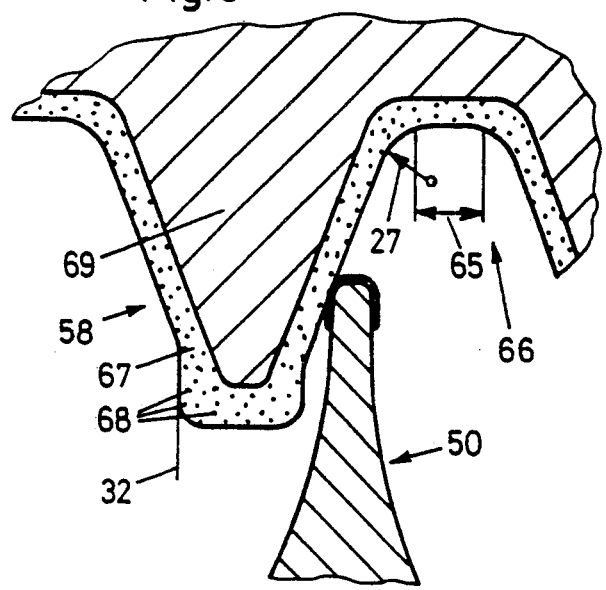
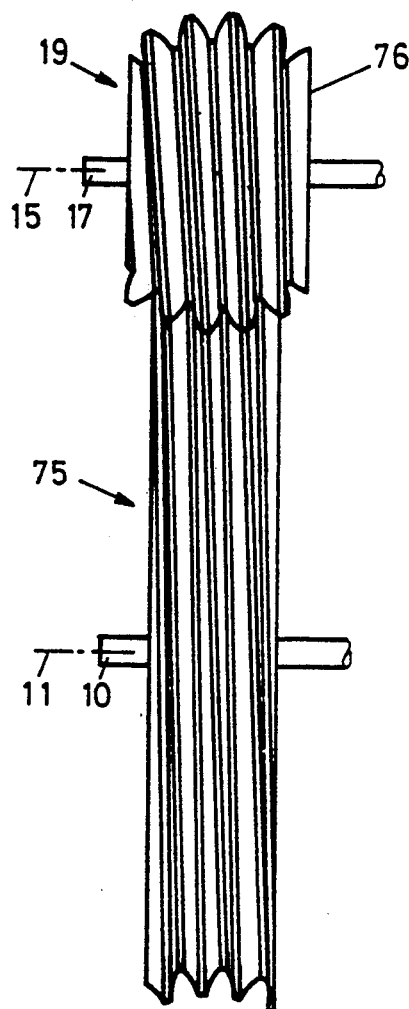
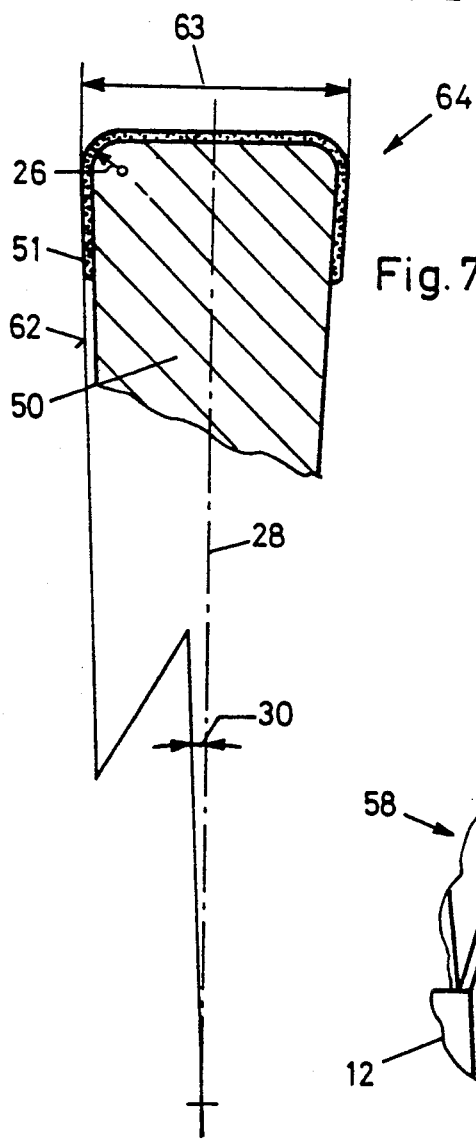
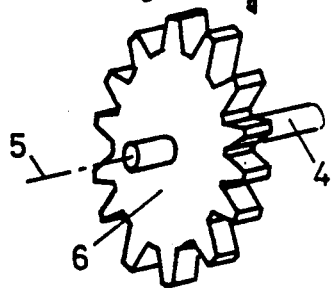
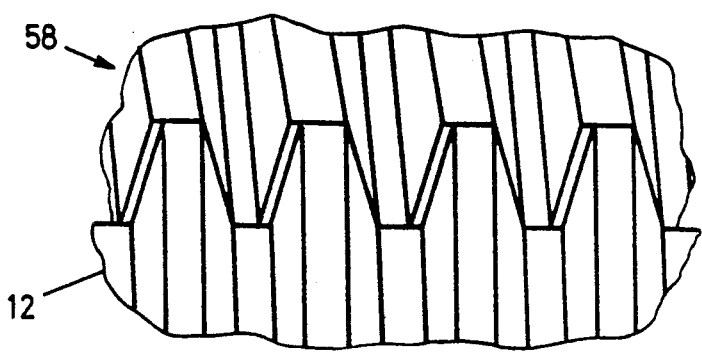

METHOD OF AND APPARATUS FOR PROFILING GRINDING WHEELS

BACKGROUND OF THE INVENTION

The present invention relates to an improved method and apparatus for profiling grinding wheels.

When grinding profiled workpieces on grinders, e.g., round, flat, gear, and thread grinders, the object of conventional systems has been to profile the grinding wheel economically and accurately, and to render the grinding wheel capable of cutting again with the requisite trueness by dressing the wheel when it has become worn and dull.

To accomplish these objectives, there are various conventional methods currently used. One method includes moving along the contour of the grinding wheel with a single diamond or with a diamond-studded crushing roller by a template or a numerically-controlled dressing device, to thereby sharpen and profile the grinding wheel. This process is very flexible with respect to shaping, and therefore is suitable for limited production. However, the dressing periods are long, since the dressing tool makes only quasi point-by-point contact with the grinding wheel, and therefore must be guided along the contour by a relatively slow feed.

Another conventional method includes using a diamond-studded crushing roller that exhibits the whole outline and profiles the entire width of the grinding wheel simultaneously. This method results in shorter dressing periods, since the grinding wheel is engaged linearly by the crushing roller. However, practically it is suitable only for large-scale production, since the crushing roller is very expensive, a long lead-time is required for design and acquisition of the roller, and because it is impossible to subsequently change the shape.

A third conventional method includes crush dressing the outline with crusher rollers (steel rollers) at a low circumferential speed. However, this method has limited popularity today, and is applied exclusively to one-time production of special profiles.

A dressing method and device are described in U.S. Pat. No. 2,720,062, in which a grinding wheel is fed alternatively to a workpiece and to a dressing roller which trims it to the requisite shape. A conditioning roller having the same contour as the grinding wheel can be fed against the dressing roller to dress it. However, this method has all of the drawbacks of the aforementioned dressing methods, and therefore has not been put into practice.

SUMMARY OF THE INVENTION

The object of the present invention is to provide a method of profiling and dressing a grinding wheel which combines high flexibility with short dressing periods.

According to the invention, a method for dressing profile grinding wheels includes moving a profiled dressing roller radially against a grinding wheel to linearly contact it while dressing, and between dressing operations a conditioning mechanism is moved radially relative to the dressing roller. The conditioning step includes contacting the dressing roller point-wise with the conditioning mechanism and moving the conditioning mechanism axially by program control synchronously with the radial feed movement relative to the dressing roller.

The inventive apparatus includes a grinding spindle which clamps a grinding wheel and which is driven rotatably around a first axis by a first drive mechanism, a dressing spindle which clamps a dressing roller and which is driven rotatably around a second axis by a second drive mechanism and displaced radially relative to the grinding spindle by a first feed mechanism, a conditioning mechanism displaced radially relative to the dressing spindle by a second feed mechanism, the conditioning mechanism being displaced axially relative to the dressing spindle by a third feed mechanism, the dressing spindle moving radially relative to the conditioning mechanism, and a controller which synchronizes the movement of the second and third feed mechanisms by program control.

With the inventive method and apparatus, a highly flexible dressing operation may be performed rapidly.

BRIEF DESCRIPTION OF THE DRAWINGS

FIG. 6 is an axial view of the dressing roller shown in FIG. 5 during a conditioning operation.

FIG. 7 is a sectional axial view of the conditioning wheel shown in FIG. 5.

FIG. 8 is a modification of the embodiment of FIG. 5 shown when dressing the grinding worm.

FIG. 9 is a schematic view of an apparatus for dressing profiled grinding wheels according to a fourth embodiment of the invention.

DETAILED DESCRIPTION OF THE PREFERRED EMBODIMENTS

Figure 1:
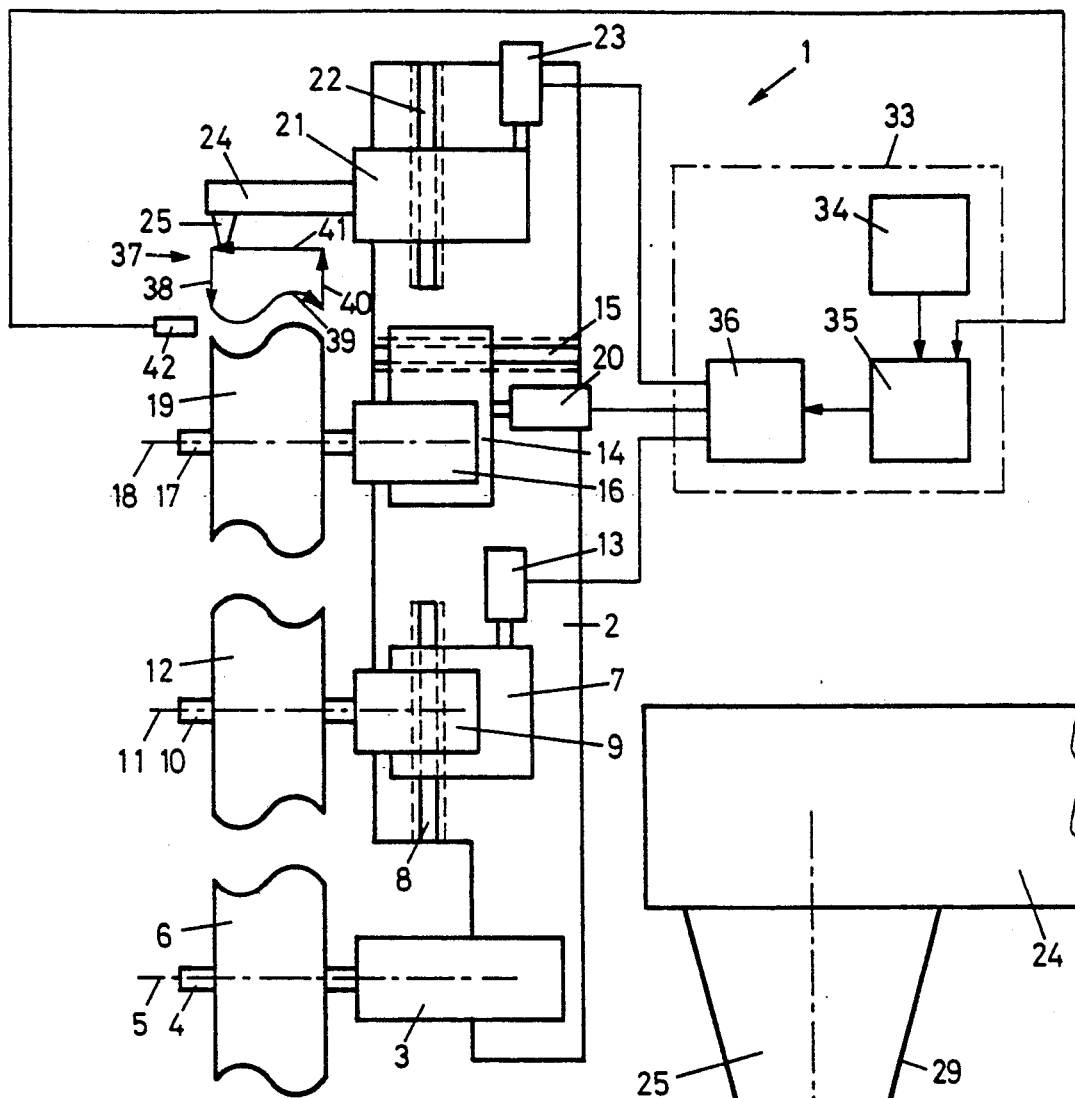
FIG. 1 is a schematic view of an apparatus for dressing profiled grinding wheels according to a first embodiment of the invention.

Referring to FIG. 1, a first embodiment of the invention is shown in which an apparatus 1 for profiling grinding wheels includes a frame 2 which has a drive motor 3 attached thereto which drives spindle 4 to rotate around an axis 5 and which supports a workpiece 6. A carriage 7 is positioned on the frame 2 movably in a guide 8 radially to the axis 5, and supports a grinding spindle motor 9 having a grinding wheel spindle 10 coupled thereto and an axis of rotation 11. A profile grinding wheel 12 is mounted on the spindle 10, and is made of, e.g., synthetic resin or ceramic-bonded silicon carbide or corundum. The carriage 7 is movable by a servomotor 13 radially to the parallel axes 5, 11. On the frame 2, a second carriage 14 is movable in a guide 15 parallel to the axes 5, 11, and supports a motor 16, which drives a dressing roller spindle 17 having an axis 18 parallel to the axes 5, 11. A dressing roller 19 mounted on the spindle 17 linearly contacts the grinding wheel 12 when dressing, and has abrasive grains having a hardness higher than that of the abrasive grains of the grinding wheel 12. The dressing roller 19 may have, e.g., a shell made of ceramically bonded cubic boron nitride (CBN). The carriage 14 may be moved by another servomotor 20. A third carriage 21 positioned on frame 2 is vertically (e.g., perpendicularly) movable to axes 5, 11, 18 in another guide 22 which is preferably parallel to guide 8 and movable by a third servomotor 23. The carriage supports an arm 24 with a conditioning diamond 25.

Figure 2:
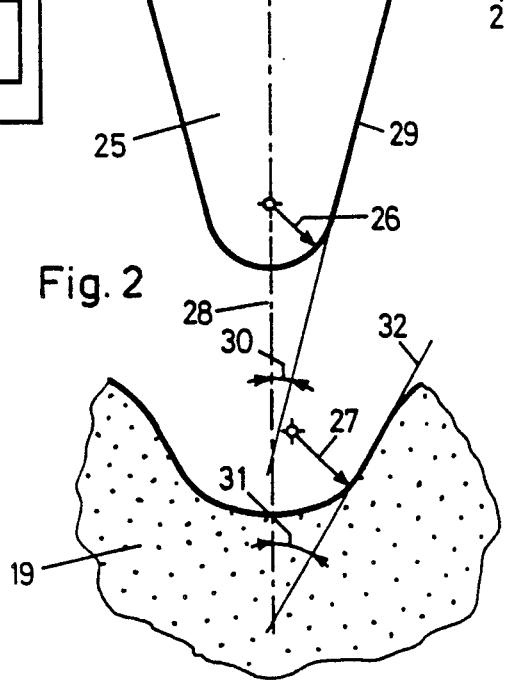
FIG. 2 illustrates a portion of the embodiment of FIG. 1 on an enlarged scale.

FIG. 2 shows the cutting geometry of the conditioning diamond 25 on an enlarged scale and a segment of the dressing roller profile. The diamond 25 preferably is triangular with a rounded-off point opposed to the dressing roller 19 having a radius of curvature 26 slightly smaller than the smallest radius of curvature 27 of the dressing roller profile. The diamond 25, for example, is symmetrical relative to an axis 28 perpendicular to the axes 5, 11, and 18. The side flanks 29 of the diamond 25 (in a line extended therefrom) with axis 28 form an angle 30, which is smaller than the smallest angle 31 formed by the tangent 32 of the dressing roller contour with the axis 28. Thus, when conditioning, the diamond 25 makes quasi-pointwise contact with the dressing roller 19.

The three servomotors 13, 20, 23 are controlled by a programmable controller 33 having an input unit 34, e.g., a keyboard, to enter program data, a register 35, e.g., a read-only memory, to store program data, and an amplifier 36. With the amplifier, the feed stroke of the servomotor 13 coupled to the grinding wheel 12 which grinds the workpiece 6 and the dressing roller 19 which dresses the grinding wheel 12 is controlled according to the data entered. The grinding wheel 12, actuated by the motor 13, is dressed by being pressed against the dressing roller 19, e.g., while changing the workpiece. The spindles 10, 17 rotate such that the circumferential speeds widely widely at the grinding wheel 12 and the dressing roller 19 are different, and thus material is removed from the grinding wheel 12 to form the outline of the dressing roller 19 on the grinding wheel 12. Due to the linear contact therebetween, this process is very fast since only a single radial-feed movement is required.

Even though the dressing roller 19 is made of a material harder than that of the grinding wheel 12, particles are dislodged and removed from the dressing roller 19 during dressing. Thus, it has been observed that over a long time period the profile loses its trueness. To prevent this problem, the dressing roller 19 is conditioned (e.g., dressed and sharpened) by the diamond 25 during the subsequent grinding operation, e.g., when the grinding wheel 12 makes contact with the workpiece 6 again. Conditioning results from a program-controlled relative movement in a direction shown by arrow 37 in FIG. 1, between diamond 25 and dressing roller 19 by synchronously driving the servomotors 20, 23. The relative movement 37 begins with a radial feed movement 38 by the motor 23, and the diamond 25 traverses a distance 39 relative to the dressing roller 19 corresponding to the desired profile by both motors 20, 23 controlled by the amplifier 36 according to the program data stored in the register 35. Thereafter, a return movement 40 is performed and an axial reset 41 is effected by motor 20. To determine the required radial feed movement 38, a diameter measuring device 42 may be positioned at a point on the circumference of the dressing roller 19. Further, the motor 16 may be connected stationarily (e.g., fixed) to the frame 2, and the carriage 21 may be a compound slide.

Figure 3:
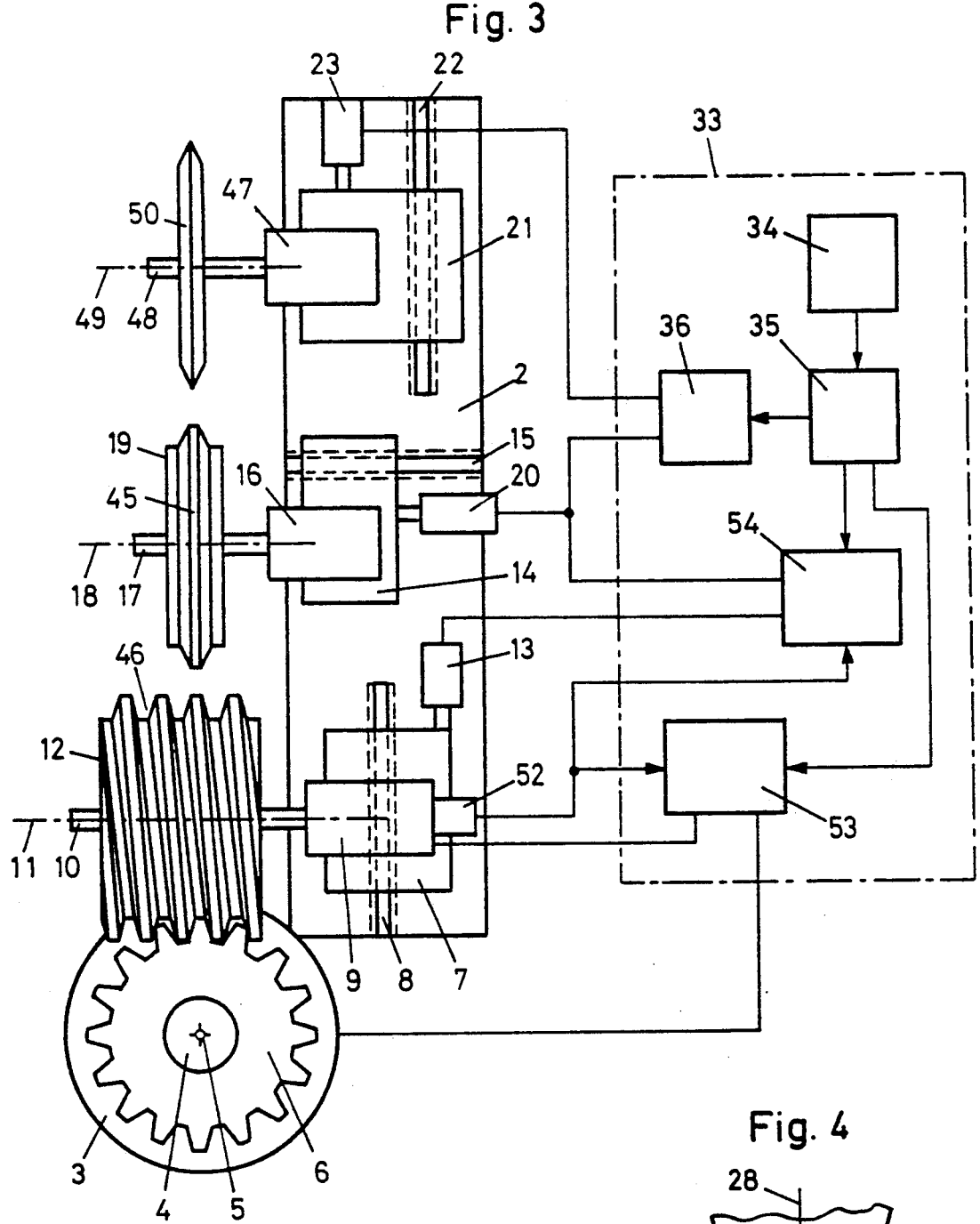
FIG. 3 is a schematic view of an apparatus for dressing profiled grinding wheels according to a second embodiment of the invention.

In the embodiment according to FIG. 3, the workpiece 6 is a gear, which is machined in a continuous meshing action with the cylindrical grinding wheel 12 (shown as a worm). The axes 5, 11 are either perpendicular or skewed to one another. The dressing roller 19 has a rotationally symmetrical edge 45 with a profile corresponding to the groove 46 of the grinding worm 12. The carriage 21 supports a motor 47 with a conditioning wheel spindle 48, which rotates around an axis 49 parallel to the axis 18. A rotationally symmetrical steel wheel 50, whose outermost, e.g., toroidal edge has a coating 51 with diamond grains, is clamped on spindle 48.

Figure 4:
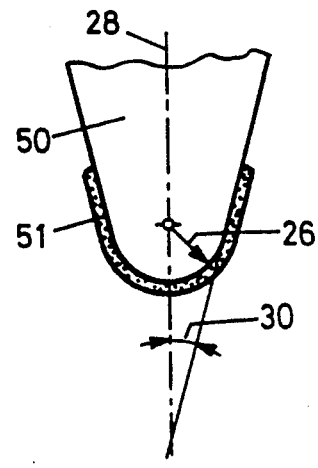
FIG. 4 illustrates a portion of the embodiment of FIG. 3 on an enlarged scale.
Figure 5:
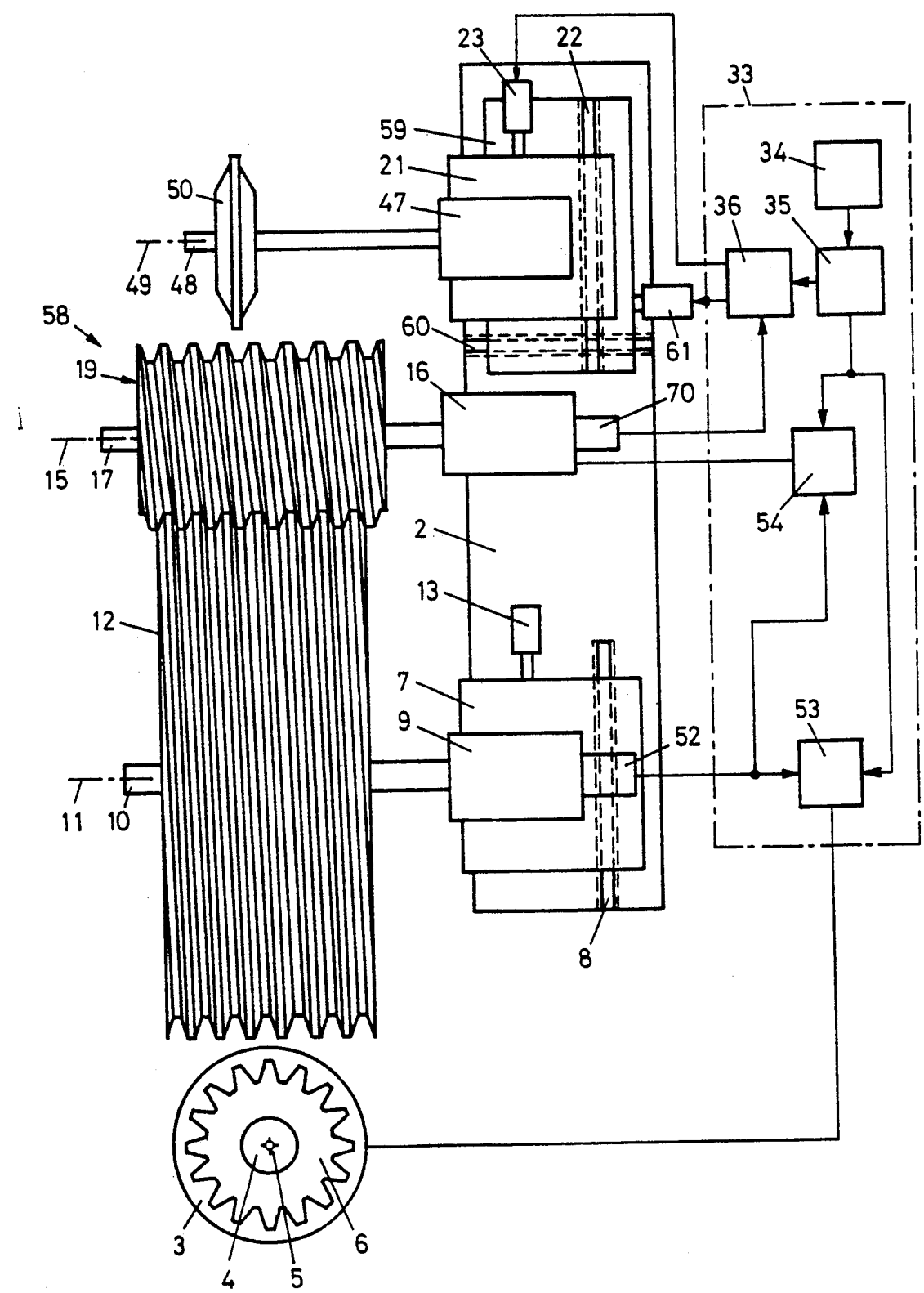
FIG. 5 is a schematic view of an apparatus for dressing profiled grinding wheels according to a third embodiment of the invention.

As shown in FIG. 4, the radii of curvature 26 and the flank angles 30 of this edge must satisfy the conditions described above in connection with FIG. 2. Similarly to the diamond 25 shown in FIG. 1, the conditioning wheel 50 has a workpiece-neutral profile. Other workpiece-neutral profiles, e.g., including straight lines and curves, different from that shown in FIG. 4 also can be used. The flexibility of the inventive method is based on this workpiece-neutral profile, since different dressing roller profiles can be produced with the same conditioning wheel 50.

The grinding spindle 10 is connected to an angle transmitter 52 which controls the motor 3, e.g., a servomotor, by a servoamplifier 53, so that spindles 4, 10 run precisely and synchronously with a fixed, integral speed ratio according to the proportion of the number of teeth of the grinding worm 12 to that of the gear 6. Additionally, the controller 33 has a second servoamplifier 54, which ensures that carriage 14 slides synchronously with the rotation angle of the grinding spindle 10 while dressing, analogously to thread grinding. In contrast, when conditioning, the servomotor 20 is synchronized similarly by the amplifier 36 with the servomotor 23, as in the embodiment of FIG. 1.

The dressing methods and devices according to FIGS. 1 and 3 have the following advantages over the conventional dressing processes.

1. The inventive method and device enable short dressing periods due to dressing wheel 19 linearly contacting the grinding wheel 12.

2. Simultaneously, due to the program-controlled conditioning of the dressing wheel 19 by the simply constructed (and therefore inexpensively manufacturable) conditioning wheel 50, small corrections can be applied subsequently and easily to the dressing wheel 19.

3. The same conditioning wheel 50 can be used to condition various dressing rollers 19.

4. Conditioning is performed while a workpiece 6 is being machined by the grinding wheel 12, so that there is no loss of time and a highly efficient process results.

Thus, the dressing method according to the invention is very flexible, and can be used for small quantity production, with short dressing periods being possible.

The third embodiment according to FIGS. 5-8 differs from the second embodiment primarily by the dressing roller 19 being a cylindrical dressing worm 58 which is axially longer than the grinding worm 12, and the carriage 14 shown in FIG. 3 being dispensed with. Hence, the carriage 21, shown in FIG. 3, is designed as a compound slide, and is moved by the servomotor 23 perpendicularly to axis 49 of the conditioning wheel 50 and additionally by carriage 59 movable in a guide 60 parallel to the axis 15 by a servomotor 61 analogously to the servomotor 20 shown in FIG. 3.

As in the above-described embodiments, when conditioning the dressing worm 58 by the wheel 50, only the outermost edge (FIGS. 6 and 7) of the wheel engages the worm. Because a tangent 32 is desirably formed to run radially in the crown region of the dressing worm 58, the angle 30 between the flank 62 and the axis of symmetry 28 is negative, as shown in FIG. 7. The width 63 of the edge 64 of the conditioning wheel 50 is less than the width 65 of the grooves 66 of the dressing worm 58. The outer circumference of the dressing worm 58 has a layer 67 of, e.g., ceramically bonded CBN, on a metal body 69.

The servoamplifier 53 ensures that the servomotor 3 runs synchronously with the motor 9, and the amplifier 36 synchronizes the servomotors 23, 61, which likewise must be synchronized with the rotation angle of the dressing roller spindle 17. To achieve this aspect, spindle 17 is coupled with an angle transmitter 70. The servoamplifier 54 synchronizes the motor 16, designed as 1 servomotor, with the motor 9. The speed ratio corresponds to the proportion of the number of teeth of the grinding worm 12 to that of the dressing worm 58. When the spindles 10, 17 are pitched in the same sense, they rotate in the same direction. However, when the spindles are pitched in the opposite sense, they rotate in the opposite direction.

As shown in FIG. 8, the tooth width of the dressing worm 58 can be smaller than the width of the tooth space of the grinding worm 12. In this case, the two flanks of the teeth of the grinding worm 12 are successively machined by a controlled additional rotation of the dressing worm 58 (relative to the synchronous rotation with the grinding worm 12) first in one direction, and then in a second direction. Instead of an additional rotation, the relative displacement of the tooth profiles of the grinding worm and the dressing worm can also be achieved by linear displacement by using another carriage. Compared to the embodiment of FIG. 3, the embodiment of FIG. 5 has the following additional advantages.

1) The dressing times are significantly shorter since the grinding wheel 12 is trimmed simultaneously over its entire width.

2) For kinetic reasons, the speed of the grinding wheel 12 in the embodiment of FIG. 3 is less by an order of magnitude during dressing than the speed used typically for machining the gear 6. Otherwise, the required synchronization accuracy of the servomotor 20 with the rotation angle of the grinding spindle would be impossible. Hence, shape changes of the grinding worm 12 generated as a consequence of the centrifugal forces will not have a negative impact on the worm accurately produced beforehand. In contrast, in the embodiment according to FIG. 5, dressing can be performed at the same spindle speed as that used for grinding, so that the above problems are avoided.

As shown in FIG. 9, the invention can dress a globoid grinding worm 75 with a re-dressable dressing tool. This feature was deemed impossible hitherto the invention, and the conventional methods used a dressing gear identical to that of the gear 6 to be ground, but that was coated with diamond grit, to dress a globoid grinding worm. This arrangement is very expensive and does not allow subsequent changes to be made. Therefore, the grinding process using globoid worms was applied previously only to large-scale quantity production. The present invention overcomes this difficulty by providing a dressing tool for such globoid grinding worm 75 which can be trimmed by a numerical control program, and therefore small corrections can be transferred to the grinding worm by merely changing the program.

As shown in FIG. 9, the axes 5, 11 of the workpiece and the grinding spindle intersect to be skewed. When grinding, the grinding worm 75 abuts the gear over the entire axial width of the gear 6 the axes 11 and 15 are preferably parallel to each other. As shown, the dressing worm 76 may be barrel-shaped. Since the embodiment of FIG. 9 corresponds to that of FIG. 5 other elements of the device common thereto and a description thereof are omitted.

Instead of having the dressing device built into the grinder as shown above, it may be constructed separately therefrom. Furthermore, the abrasive grains of the conditioning wheel can be as hard or softer than those of the dressing roller. In this case, the binding for the grains of the conditioning wheel must be selected in relation to that of the dressing roller so that the dressing roller grains are dislodged by the conditioning wheel, e.g., similar to when crush dressing with a "soft" steel roller, a "hard" grinding wheel is profiled. It is important that the dressing roller itself can be trimmed.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A method for dressing a grinding wheel (12) by a profiled dressing roller (19), said method comprising:
    moving said grinding wheel (12) radially against said dressing roller (19), said dressing roller (19) linearly contacting said grinding wheel (12) to dress said wheel; and
    conditioning said dressing roller (19) with a conditioning mechanism (25, 50) moved radially thereto, wherein said conditioning step includes contacting said dressing roller (19) substantially in point contact with said conditioning mechanism (25, 50) and one of said dressing roller and said conditioning mechanism being axially movable synchronously by program control with radial movement of said conditioning mechanism (25, 50) relative to said dressing roller (19).

2. An apparatus for dressing a grinding wheel, comprising:
    a first spindle (10) driven rotatably around a first axis (11) by a first drive mechanism (9), a grinding wheel (12) being mounted on said first spindle (10);
    a second spindle (17) driven rotatably around a second axis (18) by a second drive mechanism (16);
    a dressing roller (19) mounted on said second spindle (17);
    a first feed mechanism (13) for displacing said first spindle (10) radially relative to said second spindle (17) along a third axis (8);
    a conditioning mechanism (25, 50) displaced radially relative to said second spindle (17);
    a second feed mechanism (23) for displacing said conditioning mechanism (25, 50) radially relative to said second spindle (17);
    a third feed mechanism (20) for displacing said dressing roller (19) axially relative to said conditioning mechanism (25, 50); and a controller (33) which synchronizes movement of said second and third feed mechanisms (23, 20).

3. An apparatus according to claim 2, wherein said conditioning mechanism (25, 50) comprises a conditioning wheel (50) rotatably driven around a fourth axis (49) by a fourth drive mechanism (47) and having an outer circumference with a radially symmetrical edge coated with abrasive grains, and wherein said edge of said conditioning wheel exclusively contacts said dressing roller (19, 58).

4. An apparatus according to claim 2, wherein said dressing roller (19, 58) and said grinding wheel (12) each include abrasive grains, wherein said abrasive grains of said dressing roller (19, 58) have a hardness higher than that of said abrasive grains of said grinding wheel (12).

5. An apparatus according to claim 2, wherein said dressing roller (19) linearly contacts said grinding wheel, thereby to dress said grinding wheel (12), and wherein said conditioning mechanism (25, 50) makes substantially a point contact with said dressing roller to condition said dressing roller (19).

6. An apparatus according to claim 2, wherein said grinding wheel (12) comprises a grinding worm, said dressing roller (19) being radially symmetrical, and said second spindle (17) being displaced relative to said first spindle (10) parallel to said first axis (11) by said third feed mechanism (20) synchronously with rotation of said first spindle (10).

7. An apparatus according to claim 2, wherein said grinding wheel comprises a grinding worm (12, 75), and said dressing roller comprises a worm roller (58, 76) having an axial width at least equal to that of said grinding worm (12, 75), wherein said controller (33) includes a synchronizing device (54) which synchronizes the first and second drive mechanisms (9, 16), such that said second spindle (17) rotates synchronously with said first grinding spindle (10) during dressing.

8. An apparatus according to claim 7, further comprising a second synchronizing device (36) and an angle transmitter (70) which controls said second synchronizing device (36) to synchronize movement of said conditioning mechanism (25, 50), said angle transmitter being connected to said second spindle (17).

9. An apparatus according to claim 7, wherein said worm roller (58, 76) and said grinding worm (12, 75) each include teeth on a circumferential surface thereof, a width of said teeth of said worm roller (58, 76) being less than a distance between successive teeth of said grinding worm (12, 75), and wherein said controller comprises means (34, 35) for superposing an additional relative movement controlled in terms of speed and amount and superimposed on the synchronous rotation of said first and second drive mechanisms (9, 16).

10. An apparatus according to claim 7, wherein said grinding worm (75) has a globoid shape and said dressing roller (76) has a barrel shape.

11. An apparatus according to claim 7, wherein said dressing roller for said grinding worm (75) is trimmed by numerical control by a controller.

12. An apparatus according to claim 2, wherein said grinding wheel comprises a ceramically-bonded silicon carbide.

13. An apparatus according to claim 2, wherein said grinding wheel comprises corundum.

14. An apparatus according to claim 2, wherein said dressing roller includes a shell made of ceramically-bonded cubic boron nitride.

15. An apparatus according to claim 2, wherein said conditioning mechanism comprises a diamond (25) having a triangular shape with a rounded-off point facing said dressing roller.

16. An apparatus according to claim 2, wherein said controller includes an input unit, a register to store program data, and an amplifier.

17. An apparatus according to claim 2, wherein said conditioning mechanism (50) has a workpiece-neutral profile such that dressing rollers different in their profiles are produced with said conditioning mechanism (50).

18. An apparatus according to claim 2, wherein said dressing roller comprises a cylindrical dressing wheel wider in an axial direction than said grinding worm (12).

19. An apparatus according to claim 2, wherein said grinding wheel (12) comprises synthetic resin-bonded grains of one of silicon carbide and corundum.

20. An apparatus according to claim 2, wherein said controller synchronizes movement of said second and third feed mechanisms by programmable control.

* * * * *